(12) United States Patent
Wilkins et al.

(10) Patent No.: US 9,924,161 B2
(45) Date of Patent: *Mar. 20, 2018

(54) SYSTEM AND METHOD FOR VIDEO CODING USING ADAPTIVE SEGMENTATION

(71) Applicants: Paul Wilkins, Cambridge (GB); James Bankoski, North Greenbush, NY (US); Yaowu Xu, Clifton Park, NY (US)

(72) Inventors: Paul Wilkins, Cambridge (GB); James Bankoski, North Greenbush, NY (US); Yaowu Xu, Clifton Park, NY (US)

(73) Assignee: GOOGLE LLC, Mountain View, CA (US)

( * ) Notice: Subject to any disclaimer, the term of this patent is extended or adjusted under 35 U.S.C. 154(b) by 1312 days.

This patent is subject to a terminal disclaimer.

(21) Appl. No.: 13/680,636

(22) Filed: Nov. 19, 2012

(65) Prior Publication Data

US 2013/0101019 A1    Apr. 25, 2013

Related U.S. Application Data

(63) Continuation of application No. 12/329,177, filed on Dec. 5, 2008, now Pat. No. 8,325,796.

(Continued)

(51) Int. Cl.
*H04N 7/12*  (2006.01)
*H04N 19/10*  (2014.01)
(Continued)

(52) U.S. Cl.
CPC ....... *H04N 19/00006* (2013.01); *H04N 19/10* (2014.11); *H04N 19/117* (2014.11);
(Continued)

(58) Field of Classification Search
CPC ............ H04N 19/00006; H04N 19/10; H04N 19/117; H04N 19/124; H04N 19/17;
(Continued)

(56) References Cited

U.S. PATENT DOCUMENTS 3,825,832 A   7/1974  Frei et al.
4,463,372 A   7/1984  Bennett et al.
(Continued)

FOREIGN PATENT DOCUMENTS

EP    1351510 A1    10/2003
GB    2350515 A     11/2000
(Continued)

OTHER PUBLICATIONS

Sikora, T. et al., Shape-adaptive DCT for generic coding of video, Circuits and Systems for Video Technology, IEEE Transactions on vol. 5, Issue 1, p. 59-62, Feb. 1, 1995.

(Continued)

*Primary Examiner* — Jessica M Prince
(74) *Attorney, Agent, or Firm* — Young Basile Hanlon & MacFarlane, P.C.

(57) ABSTRACT

A method for decoding compressed video information is disclosed. The video information can include a plurality of frames each having a plurality of blocks. The method reading, from the video information, a segment map associating at least some of the plurality of blocks in a first frame of the plurality of frames with at least one segment identifier, reading, from the video information, a current block to be decoded by a decoder, reading, from the segment map, a segment identifier that is associated with the current block, reading, from the video information, at least one segment parameter associated with the segment identifier that is associated with the current block and decoding the current block using the at least one segment parameter associated (Continued)

with the segment identifier that is associated with the current block.

20 Claims, 6 Drawing Sheets

Related U.S. Application Data

(60) Provisional application No. 61/096,242, filed on Sep. 11, 2008.

(51) Int. Cl.

| | | |
|---|---|---|
| H04N 19/176 | (2014.01) | |
| H04N 19/196 | (2014.01) | |
| H04N 19/61 | (2014.01) | |
| H04N 19/117 | (2014.01) | |
| H04N 19/463 | (2014.01) | |
| H04N 19/124 | (2014.01) | |
| H04N 19/17 | (2014.01) | |
| H04N 19/82 | (2014.01) | |
| H04N 19/21 | (2014.01) | |
| H04N 19/523 | (2014.01) | |

(52) U.S. Cl.
CPC ........... *H04N 19/124* (2014.11); *H04N 19/17* (2014.11); *H04N 19/176* (2014.11); *H04N 19/196* (2014.11); *H04N 19/21* (2014.11); *H04N 19/463* (2014.11); *H04N 19/523* (2014.11); *H04N 19/61* (2014.11); *H04N 19/82* (2014.11)

(58) Field of Classification Search
CPC .... H04N 19/176; H04N 19/196; H04N 19/21; H04N 19/463; H04N 19/523; H04N 19/61; H04N 19/82
USPC .................................................. 375/240.02
See application file for complete search history.

(56) References Cited

U.S. PATENT DOCUMENTS

| | | |
|---|---|---|
| 4,710,810 A | 12/1987 | Koga |
| 4,719,642 A | 1/1988 | Lucas |
| 4,729,127 A | 3/1988 | Chan et al. |
| 4,736,446 A | 4/1988 | Reynolds et al. |
| 4,816,906 A | 3/1989 | Kummerfeldt et al. |
| 4,868,764 A | 9/1989 | Richards |
| 4,891,748 A | 1/1990 | Mann |
| 5,068,724 A | 11/1991 | Krause et al. |
| 5,083,214 A | 1/1992 | Knowles |
| 5,091,782 A | 2/1992 | Krause et al. |
| 5,122,873 A | 6/1992 | Golin |
| 5,136,371 A | 8/1992 | Savatier et al. |
| 5,136,376 A | 8/1992 | Yagasaki et al. |
| 5,148,269 A | 9/1992 | de Haan et al. |
| 5,164,819 A | 11/1992 | Music |
| 5,231,484 A | 7/1993 | Gonzales et al. |
| 5,270,812 A | 12/1993 | Richards |
| 5,274,442 A | 12/1993 | Murakami et al. |
| 5,295,201 A | 3/1994 | Yokohama |
| 5,313,306 A | 5/1994 | Kuban et al. |
| 5,337,086 A | 8/1994 | Fujinami |
| 5,341,440 A | 8/1994 | Earl et al. |
| 5,351,086 A | 9/1994 | Park |
| 5,374,958 A | 12/1994 | Yanagihara |
| 5,398,068 A | 3/1995 | Liu et al. |
| 5,432,870 A | 7/1995 | Schwartz |
| 5,452,104 A | 9/1995 | Lee |
| 5,461,423 A | 10/1995 | Tsukagoshi |
| 5,463,701 A | 10/1995 | Kantner, Jr. et al. |
| 5,512,952 A | 4/1996 | Iwamura |
| 5,561,475 A | 10/1996 | Jung |
| 5,561,477 A | 10/1996 | Polit |
| 5,576,767 A | 11/1996 | Lee et al. |
| 5,589,945 A | 12/1996 | Abecassis |
| 5,596,370 A | 1/1997 | Jung |
| 5,659,539 A | 8/1997 | Porter et al. |
| 5,666,461 A | 9/1997 | Igarashi et al. |
| 5,686,962 A | 11/1997 | Chung et al. |
| 5,696,869 A | 12/1997 | Abecassis |
| 5,734,744 A | 3/1998 | Wittenstein et al. |
| 5,737,020 A | 4/1998 | Hall et al. |
| 5,748,247 A | 5/1998 | Hu |
| 5,767,909 A | 6/1998 | Jung |
| 5,768,533 A | 6/1998 | Ran |
| 5,774,593 A | 6/1998 | Zick et al. |
| 5,777,680 A | 7/1998 | Kim |
| 5,793,647 A | 8/1998 | Hageniers et al. |
| 5,818,536 A | 10/1998 | Morris et al. |
| 5,818,969 A | 10/1998 | Astle |
| 5,828,370 A | 10/1998 | Moeller et al. |
| 5,886,742 A | 3/1999 | Hibi et al. |
| 5,903,264 A | 5/1999 | Moeller et al. |
| 5,929,940 A | 7/1999 | Jeannin |
| 5,930,379 A | 7/1999 | Rehg et al. |
| 5,930,493 A | 7/1999 | Ottesen et al. |
| 5,963,203 A | 10/1999 | Goldberg et al. |
| 5,991,447 A | 11/1999 | Eifrig et al. |
| 5,999,641 A | 12/1999 | Miller et al. |
| 5,999,655 A | 12/1999 | Kalker et al. |
| 6,005,980 A | 12/1999 | Eifrig et al. |
| 6,011,872 A | 1/2000 | Qian et al. |
| 6,014,706 A | 1/2000 | Cannon et al. |
| 6,026,183 A | 2/2000 | Talluri et al. |
| 6,035,059 A | 3/2000 | Kurosawa et al. |
| 6,035,060 A | 3/2000 | Chen et al. |
| 6,035,067 A | 3/2000 | Ponticos |
| 6,041,145 A | 3/2000 | Hayashi et al. |
| 6,055,330 A | 4/2000 | Eleftheriadis et al. |
| 6,061,397 A | 5/2000 | Ogura |
| 6,075,875 A | 6/2000 | Gu |
| 6,084,908 A | 7/2000 | Chiang et al. |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,125,144 A | 9/2000 | Matsumura et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,212,234 B1 | 4/2001 | Andoh et al. |
| 6,222,174 B1 | 4/2001 | Tullis et al. |
| 6,233,017 B1 | 5/2001 | Chaddha |
| 6,240,135 B1 | 5/2001 | Kim |
| 6,249,613 B1 | 6/2001 | Crinon et al. |
| 6,249,614 B1 | 6/2001 | Kolesnik et al. |
| 6,256,423 B1 | 7/2001 | Krishnamurthy et al. |
| 6,271,890 B1 | 8/2001 | Tamir et al. |
| 6,272,179 B1 | 8/2001 | Kadono |
| 6,275,614 B1 | 8/2001 | Krishnamurthy et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,337,917 B1 | 1/2002 | Onural et al. |
| 6,359,929 B1 | 3/2002 | Boon |
| 6,370,267 B1 | 4/2002 | Miller et al. |
| 6,377,709 B1 | 4/2002 | Guillotel |
| 6,381,277 B1 | 4/2002 | Chun et al. |
| 6,400,763 B1 | 6/2002 | Wee |
| 6,414,995 B2 | 7/2002 | Okumura et al. |
| 6,418,166 B1 | 7/2002 | Wu et al. |
| 6,427,028 B1 | 7/2002 | Donescu et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,526,097 B1 | 2/2003 | Sethuraman et al. |
| 6,529,634 B1 | 3/2003 | Thyagarajan et al. |
| 6,529,638 B1 | 3/2003 | Westerman |
| 6,560,366 B1 | 5/2003 | Wilkins |

(56) References Cited

U.S. PATENT DOCUMENTS

| | | | |
|---|---|---|---|
| 6,570,924 B1 | 5/2003 | Lynch et al. | |
| 6,661,842 B1 | 12/2003 | Abousleman | |
| 6,661,925 B1 | 12/2003 | Pianykh et al. | |
| 6,687,303 B1 | 2/2004 | Ishihara | |
| 6,697,061 B1 | 2/2004 | Wee et al. | |
| 6,707,952 B1 | 3/2004 | Tan et al. | |
| 6,711,211 B1 | 3/2004 | Lainema | |
| 6,735,249 B1 | 5/2004 | Karczewicz et al. | |
| 6,754,266 B2 | 6/2004 | Bahl et al. | |
| 6,757,434 B2 | 6/2004 | Miled et al. | |
| 6,765,964 B1 | 7/2004 | Conklin | |
| 6,826,229 B2 | 11/2004 | Kawashima et al. | |
| 6,909,749 B2 | 6/2005 | Yang et al. | |
| 6,934,419 B2 | 8/2005 | Zlotnick | |
| 6,985,526 B2 | 1/2006 | Bottreau et al. | |
| 6,985,527 B2 | 1/2006 | Gunter et al. | |
| 6,987,866 B2 | 1/2006 | Hu | |
| 6,996,283 B2 | 2/2006 | Thyagarajan | |
| 7,010,032 B1 | 3/2006 | Kikuchi et al. | |
| 7,027,506 B2 | 4/2006 | Lee et al. | |
| 7,027,654 B1 | 4/2006 | Ameres et al. | |
| 7,076,113 B2 | 7/2006 | Le Dinh | |
| 7,085,319 B2 * | 8/2006 | Prakash | H04N 19/00 375/240.08 |
| 7,116,831 B2 | 10/2006 | Mukerjee et al. | |
| 7,136,534 B2 | 11/2006 | Thyagarajan et al. | |
| 7,143,352 B2 | 11/2006 | Divakaran et al. | |
| 7,170,937 B2 | 1/2007 | Zhou | |
| 7,226,150 B2 | 6/2007 | Yoshimura et al. | |
| 7,227,977 B1 | 6/2007 | Dotsenko | |
| 7,236,524 B2 | 6/2007 | Sun et al. | |
| 7,263,125 B2 | 8/2007 | Lainema | |
| 7,330,509 B2 | 2/2008 | Lu et al. | |
| 7,499,492 B1 | 3/2009 | Ameres et al. | |
| 7,599,435 B2 | 10/2009 | Marpe et al. | |
| 7,606,310 B1 | 10/2009 | Ameres et al. | |
| 8,116,374 B2 | 2/2012 | Gordon et al. | |
| 8,155,454 B2 | 4/2012 | Raveendran | |
| 8,170,102 B2 | 5/2012 | Bhaskaran et al. | |
| 8,233,676 B2 | 7/2012 | Ngan et al. | |
| 8,243,797 B2 | 8/2012 | Lin et al. | |
| 8,503,536 B2 | 8/2013 | Zuo et al. | |
| 8,594,189 B1 | 11/2013 | Bankoski et al. | |
| 8,781,004 B1 | 7/2014 | Bankoski et al. | |
| 8,891,627 B1 | 11/2014 | Bankoski et al. | |
| 2001/0022815 A1 | 9/2001 | Agarwal | |
| 2001/0041015 A1 | 11/2001 | Chui | |
| 2002/0012471 A1 | 1/2002 | Nayyar | |
| 2002/0031272 A1 | 3/2002 | Bagni et al. | |
| 2002/0034245 A1 * | 3/2002 | Sethuraman, Sr. | H04N 19/50 375/240.03 |
| 2002/0036705 A1 | 3/2002 | Lee et al. | |
| 2002/0039441 A1 | 4/2002 | Klassen | |
| 2002/0080871 A1 | 6/2002 | Fallon et al. | |
| 2002/0136448 A1 | 9/2002 | Bortolussi et al. | |
| 2002/0145616 A1 | 10/2002 | Doan | |
| 2002/0168108 A1 | 11/2002 | Loui et al. | |
| 2002/0168114 A1 | 11/2002 | Valente | |
| 2003/0020260 A1 | 1/2003 | Maxisch | |
| 2003/0039307 A1 | 2/2003 | Prakash et al. | |
| 2003/0053685 A1 | 3/2003 | Lestideau | |
| 2003/0081850 A1 | 5/2003 | Karczewicz et al. | |
| 2003/0095598 A1 | 5/2003 | Lee et al. | |
| 2003/0123545 A1 | 7/2003 | Prakash et al. | |
| 2003/0152149 A1 | 8/2003 | Denolf | |
| 2003/0161399 A1 | 8/2003 | Ali | |
| 2003/0202594 A1 | 10/2003 | Lainema | |
| 2004/0013308 A1 | 1/2004 | Jeon et al. | |
| 2004/0028130 A1 | 2/2004 | May et al. | |
| 2004/0120398 A1 | 6/2004 | Zhang et al. | |
| 2004/0120400 A1 | 6/2004 | Linzer | |
| 2004/0131117 A1 | 7/2004 | Sheraizin et al. | |
| 2004/0156549 A1 | 8/2004 | Persiantsev | |
| 2004/0179820 A1 | 9/2004 | Kashiwagi et al. | |
| 2004/0208392 A1 | 10/2004 | Raveendran et al. | |
| 2004/0228410 A1 | 11/2004 | Ameres et al. | |
| 2004/0240555 A1 | 12/2004 | De With et al. | |
| 2004/0240556 A1 | 12/2004 | Winger et al. | |
| 2004/0252886 A1 | 12/2004 | Pan et al. | |
| 2005/0013494 A1 | 1/2005 | Srinivasan et al. | |
| 2005/0046702 A1 | 3/2005 | Katayama et al. | |
| 2005/0111744 A1 | 5/2005 | Kupeev et al. | |
| 2005/0147165 A1 | 7/2005 | Yoo et al. | |
| 2005/0152456 A1 | 7/2005 | Orchard et al. | |
| 2005/0169374 A1 | 8/2005 | Marpe et al. | |
| 2005/0180506 A1 | 8/2005 | Wittebrood et al. | |
| 2005/0206785 A1 | 9/2005 | Swan et al. | |
| 2005/0232351 A1 | 10/2005 | Jung | |
| 2005/0265447 A1 | 12/2005 | Park | |
| 2005/0276497 A1 | 12/2005 | Chen et al. | |
| 2006/0078049 A1 | 4/2006 | Bao et al. | |
| 2006/0098737 A1 | 5/2006 | Sethuraman et al. | |
| 2006/0114996 A1 | 6/2006 | Thoreau et al. | |
| 2006/0126739 A1 | 6/2006 | Stoner | |
| 2006/0155398 A1 | 7/2006 | Hoffberg et al. | |
| 2006/0165163 A1 | 7/2006 | Burazerovic et al. | |
| 2006/0215758 A1 | 9/2006 | Kawashima | |
| 2006/0239345 A1 | 10/2006 | Taubman et al. | |
| 2006/0257048 A1 | 11/2006 | Lin et al. | |
| 2007/0025444 A1 | 2/2007 | Okada et al. | |
| 2007/0064801 A1 | 3/2007 | Wang et al. | |
| 2007/0076947 A1 | 4/2007 | Wang et al. | |
| 2007/0110290 A1 | 5/2007 | Chang et al. | |
| 2007/0115156 A1 | 5/2007 | Lim et al. | |
| 2007/0140342 A1 | 6/2007 | Karczewicz et al. | |
| 2007/0140346 A1 | 6/2007 | Chen et al. | |
| 2007/0165958 A1 | 7/2007 | Picard | |
| 2007/0171974 A1 | 7/2007 | Baik | |
| 2007/0236513 A1 | 10/2007 | Hedenstroem et al. | |
| 2008/0008398 A1 | 1/2008 | Tanaka et al. | |
| 2008/0056347 A1 | 3/2008 | Chiu et al. | |
| 2008/0063069 A1 | 3/2008 | Sekiguchi et al. | |
| 2008/0151997 A1 | 6/2008 | Oguz | |
| 2008/0152245 A1 | 6/2008 | El-Maleh et al. | |
| 2008/0159408 A1 | 7/2008 | Degtyarenko | |
| 2008/0170793 A1 | 7/2008 | Yamada et al. | |
| 2008/0175475 A1 | 7/2008 | Sung | |
| 2008/0199091 A1 | 8/2008 | Srinivasan et al. | |
| 2008/0212678 A1 | 9/2008 | Booth et al. | |
| 2008/0246884 A1 | 10/2008 | Chung | |
| 2008/0260241 A1 | 10/2008 | Ye et al. | |
| 2009/0034619 A1 | 2/2009 | Mukherjee et al. | |
| 2009/0097543 A1 | 4/2009 | Pan et al. | |
| 2009/0103617 A1 | 4/2009 | Au et al. | |
| 2009/0161767 A1 * | 6/2009 | Jang | H04N 19/176 375/240.24 |
| 2009/0161938 A1 | 6/2009 | Shekhar et al. | |
| 2009/0207915 A1 | 8/2009 | Yan et al. | |
| 2009/0226044 A1 | 9/2009 | Ngan et al. | |
| 2009/0262835 A1 | 10/2009 | Srinivasan et al. | |
| 2009/0263000 A1 | 10/2009 | Shinagawa et al. | |
| 2009/0278961 A1 | 11/2009 | Mohanty et al. | |
| 2009/0296814 A1 | 12/2009 | Lin et al. | |
| 2009/0322937 A1 | 12/2009 | Young et al. | |
| 2009/0324121 A1 | 12/2009 | Bhagavathy et al. | |
| 2010/0020879 A1 | 1/2010 | Pasquier et al. | |
| 2010/0054344 A1 | 3/2010 | Puri et al. | |
| 2010/0061444 A1 | 3/2010 | Wilkins et al. | |
| 2010/0208799 A1 | 8/2010 | Park et al. | |
| 2010/0208812 A1 | 8/2010 | Murakami et al. | |
| 2010/0208827 A1 | 8/2010 | Divorra Escoda et al. | |
| 2010/0246939 A1 | 9/2010 | Aisaka et al. | |
| 2010/0272173 A1 | 10/2010 | Puri et al. | |
| 2010/0303150 A1 | 12/2010 | Hsiung et al. | |
| 2011/0007977 A1 | 1/2011 | Amonou et al. | |
| 2011/0262001 A1 | 10/2011 | Bi et al. | |
| 2012/0020407 A1 | 1/2012 | Liu et al. | |
| 2013/0251279 A1 | 9/2013 | Park et al. | |
| 2013/0266080 A1 | 10/2013 | Lu et al. | |

FOREIGN PATENT DOCUMENTS

| | | |
|---|---|---|
| GB | 2371434 A | 7/2002 |
| JP | 2217088 | 8/1990 |

(56) References Cited

FOREIGN PATENT DOCUMENTS

| | | |
|---|---|---|
| JP | 8280032 | 10/1996 |
| JP | 11262018 | 9/1999 |
| JP | 11289544 | 10/1999 |
| JP | 11313332 | 11/1999 |
| JP | 11513205 | 11/1999 |
| JP | 2007-036888 | 2/2007 |
| KR | 100213018 | 8/1999 |
| KR | 200130916 | 4/2001 |
| KR | 10-0664929 | 12/2006 |
| TW | 515199 B | 12/2002 |
| WO | WO0150770 | 7/2001 |
| WO | 2002007164 A2 | 1/2002 |
| WO | 03/041405 A1 | 11/2002 |
| WO | WO03026315 | 3/2003 |
| WO | WO2006078115 | 7/2006 |
| WO | WO2007007257 A1 | 1/2007 |
| WO | 2008002491 A2 | 1/2008 |
| WO | WO2008002491 | 1/2008 |
| WO | WO2008016605 | 2/2008 |
| WO | WO2008077119 A2 | 6/2008 |

OTHER PUBLICATIONS

Wiegand et al, "Overview of the H 264/AVC Video Coding Standard," IEEE Transactions on Circuits and Systems for Video Technology, vol. 13, No. 7, pp. 568, 569, Jul. 1, 2003.
PCT International Search Report and Written Opinion (dated Mar. 26, 2010); PCT/US2009/056486, filed Sep. 10, 2009.
Sun Y et al, Asynchronous Rate Control for Multi-Object Videos, IEEE Transactions on Circuits and Systems for Video Technology, Aug. 1, 2005, pp. 1007-1018, vol. 15, No. 8 [retrieved from Internet on Jul. 19, 2011] <URL: http:/lieeexplore. ieee.org/stamp/stamp. jsp?tp=&arnumber=1490554>.
Lee et al, Bit Allocation for MPEG-4 Video Coding with Spatio-Temporal Tradeoffs, Jun. 2003, pp. 488-502, [retrieved from Internet on Jul. 19, 2011] <URL:http://ieeexplore.ieee.org/stamp/stamp. jsp?tp=&arnumber=1207406>.
Moschetti et al, Automatic Object Extraction and Dynamic Bitrate Allocation for Second Generation Video Coding, Multimedia and Expo, 2002. ICME '02 Proceedings. 2002 IEEE International Conference on Lausanne, Switzerland, Aug. 26, 2002, pp. 493-496, vol. 1,Piscataway, New Jersey, USA.
Nunes P et al, Rate Control for Scenes with Multiple Arbitrarily Shaped Video Objects, ITG Fachberichte, Jan. 1, 1997, pp. 303-308, Berlin, Germany.
"Series H: Audiovisual and Multimedia Systems; Infrastructure of audiovisual services—Coding of moving video; Advanced video coding for generic audiovisual services". H.264. Version 1. International Telecommunication Union. Dated May, 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, An Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
U.S. Appl. No. 11/932,870, Video Compression and Encoding Method, filed Oct. 31, 2007.
ON2 Technologies Inc., White Paper TrueMotion VP7 Video Codec, Jan. 10, 2005, 13 pages, Document Version: 1.0, Clifton Park, New York.
ON2 Technologies, Inc., White Paper On2's TrueMotion VP7 Video Codec, Jul. 11, 2008, 7 pages, Document Version: 1.0, Clifton Park, New York.
Flexible Macroblock Ordering; Wikipedia; Jul. 15, 2008.
Marcos Nieto, Luis Salgado, Narciso Garcia; Fast Mode Decision Based on Activity Segmentation in H.264/AVC Encoding; Grupo de Tratamiento de Imagenes—E.T.S. Ingenieros de Telecomunicacion, Universidad Politecnica de Madrid, Spain; Springer-Verlag Berlin Heidelberg 2006.
Congxia Dai; Escoda, O.D.; Peng Yin; Xin Li; Gomila, C., "Geometry-Adaptive Block Partitioning for Intra Prediction in Image & Video Coding," Image Processing, 2007. ICP 2007. IEEE International Conference on, vol. 6, no., pp. VI-85, VI-88, Sep. 16, 2007-Oct. 19, 2007.
Papathanassiadis T., "Image Block Partitioning: A Compression Technique Suitable fo Parallel Processing", Image Processing and Its Applications, 1992. International Conference on Maastricht, Netherlands, London, UK. Jan. 1, 1992.
ISO/IEC: "Information Technology—Coding of audio-visual objects" Retrieved from the Internet: Http://kazus.ru/nuke/modules/downloads/pub/144/0/ISO-IEC-14496-2-2001.
Pascal Fleury et al: "MPEG-4 video verification model: A solution for interactive multimedia applications." Journal of Electronic Imaging, SPIE/IS&T; Engineering Information Inc.; vol. 7, Jul. 1, 1998, pp. 502-515.
Bronshtein I N, et al., "Handbook of Mathematics—Passage", 2004; pp. 194-195.
ISR & Written Opinion , Re: Application # PCT/US2011/035720; dated Aug. 19, 2011.
ISR & Written Opinion, Re: Application # PCT/US2012/050042; dated Oct. 30, 2012.
Kondo, S, et al.,"A Motion Compensation Technique Using Sliced Blocks in Hybrid Video Coding", Proceedings of the 2005 International Conference on Image Processing , vol. 2, Sep. 11, 2005; pp. 305-308.
Wien et al., "H.26L Core Experiment Description for Adaptive Block Transforms," Video Coding Experts Group of ITU-T SG.16; Portland, Oregon; Aug. 2000.
Yuan, et al., "CE2: Non-Square Quadtree Transform for symmetricand asymmetric motion partitions," JCTVC-F410, 6th Meeting: Torino, IT, Jul. 14-22, 2011.

(56) References Cited

OTHER PUBLICATIONS

Ahuja, N. et al., "Detecting faces in images: a survey", IEEE Transactions on Pattern Analysis and Machine Intelligence, vol. 24, No. 1, Jan. 1, 2002, pp. 34-58.
European Search Report for EP13747176 related matter, dated Dec. 9, 2015, citing new art.
Habili N. et al., "Segmentation of the face and hands in sign language video sequences using color and motion cues", IEEE Transactions on Circuits and Systems for Video Technology, vol. 14, No. 8 Aug. 1, 2004.
Menser, B. et al., "Face detection and tracking for video coding applications", Signals, Systems and Computers, 2000 Conference Record of the Thirty-Fourth Asilomar Conference, Oct. 29, 2000.
Rein-Lien Hsu et al, "Face detection in color images", IEE Transactions on Pattern Analysis and Machine Intelligence, vol. 24, No. 5, May 1, 2002.
Yang, Liu et al., "Region-of-interest based resource allocation for conversational video communication of H.264/AVC" IEEE Transactions on Circuits and Systems for Video Technology, vol. 18, No. 1, Jan. 1, 2008, pp. 134-139.
Pierpaolo Baccichet et al. "Network-Aware H.264/AVC ROI Coding for a Multi-Camera Wireless Surveillance Network", 25. Picture Coding Symposium, Apr. 24, 2006, Beijing.
European Search Report in related matter: EP13747176, dated Apr. 19, 2016.
Giovani Gomez, et al. Automatic feature constructions and a simple rule induction algorithm for skin detection, itesm capus cuernavaca, paseo de la reforma 182 A, Temixo, Morelos 62589, Mexico, 8 pages.
Jure Kovac, et al., Human Skin Colour Clustering for Face Detection, University of Ljubljana, Slovenia, 5 pages.
M. Bierling, Displacement estimation by hierarchical blockmatching. 1998, In Proceedings of SPIE Visual Communications and Image Processing 88, p. 942-951.
Tarek Mahmound, A new fast skin color detection technique, Worl Academy of Science, Engineering and Technology 43 2008, 5 pages.
Vladimir Vezhnevets, et al., A Survey on Pixel Based Skin Color Detection Techniques, Graphics and Media Laboratory, Moscow Russia, 8 pages.
Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.

\* cited by examiner

SYSTEM AND METHOD FOR VIDEO CODING USING ADAPTIVE SEGMENTATION

CROSS-REFERENCE TO RELATED APPLICATIONS

This application is a continuation of U.S. application Ser. No. 12/329,177, filed Dec. 5, 2008, which claims priority to U.S. provisional patent application No. 61/096,242, filed Sep. 11, 2008, both of which are incorporated herein by reference in their entireties.

TECHNICAL FIELD

The present invention relates in general to video encoding and decoding.

BACKGROUND

An increasing number of applications today make use of digital video for various purposes including, for example, remote business meetings via video conferencing, high definition video entertainment, video advertisements, and sharing of user-generated videos. As technology is evolving, people have higher expectations for video quality and expect high resolution video with smooth playback at a high frame rate.

There can be many factors to consider when selecting a video coder for viewing digital video. Some applications may require excellent video quality where others may need to comply with various constraints including, for example, bandwidth or storage requirements. To permit higher quality transmission of video while limiting bandwidth consumption, a number of video compression schemes are noted including proprietary formats such as VPx (promulgated by On2 Technologies, Inc. of Clifton Park, N.Y.), H.264 standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

Modern video coding methods adjust certain compression parameters at a level of granularity that is smaller than a whole frame. For example, some compression schemes adjust the type or strength of the loop filter applied to macroblock or block boundaries to improve video quality shown to the viewer. Further, for example, a different quantization level can be applied to each macroblock in a frame. In this manner, macroblocks with important information can be transmitted at a high bit rate whereas macroblocks with less important information can be transmitted at a low bit rate.

SUMMARY

Disclosed herein are embodiments of, methods for encoding or decoding video information.

One aspect of the disclosed embodiments is a method for decoding compressed video information including a plurality of frames. Each frame has a plurality of blocks. The method includes reading, from the video information, a segment map associating at least some of the plurality of blocks in a first frame of the plurality of frames with at least one segment identifier and reading, from the video information, a current block to be decoded by a decoder. The method also includes reading, from the segment map, a segment identifier that is associated with the current block and reading, from the video information, at least one segment parameter associated with the segment identifier that is associated with the current block. Further, the method includes decoding the current block using the at least one segment parameter associated with the segment identifier that is associated with the current block.

Another aspect of the disclosed embodiments is a method for decoding a stream of encoded video information including a plurality of frames. Each frame has a plurality of blocks. The method includes, for at least a first frame, reading from the video information a segment map associating at least some of the plurality of blocks in the first frame with at least one segment identifier; and reading, from the video information, a current block of the first frame to be decoded by a decoder. The method also includes reading, from the segment map, a segment identifier associated with the current block, reading, from the video information, at least one segment parameter associated with the segment identifier that is associated with the current block and decoding the current block using the at least one segment parameter associated with the segment identifier that is associated with the current block. Further, the method includes for a second frame, decoding a block in the second frame corresponding to the current block in the first frame using the segment identifier that is associated with the current block.

Another aspect of the disclosed embodiments is a method for decoding a stream of encoded video information including a plurality of frames. Each frame has a plurality of blocks. The method includes for at least a first frame, reading from the video information a segment map associating at least some of the plurality of blocks in the first frame with at least one segment identifier, reading, from the video information, a current block of the first frame to be decoded by a decoder; and reading, from the segment map, a segment identifier associated with the current block. The method also includes reading, from the video information, at least one segment parameter associated with the segment identifier that is associated with the current block, and decoding the current block using the at least one segment parameter associated with the segment identifier that is associated with the current block. Further, the method includes for a second frame, decoding a block in the second frame corresponding to the current block in the first frame using the segment identifier that is associated with the current block.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
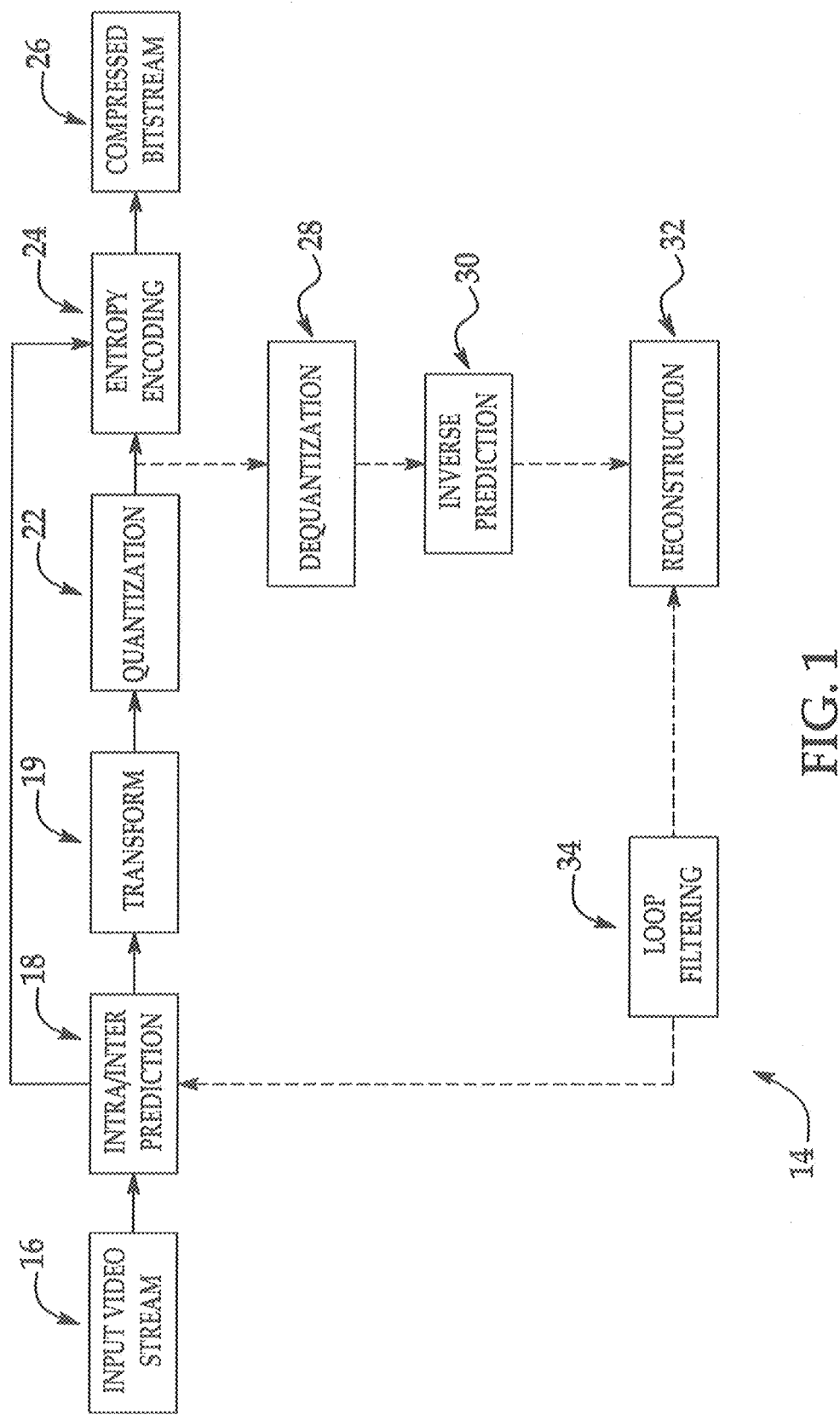
FIG. 1 is a block diagram of a video compression system in accordance with one embodiment of the present invention.

Video compression usually refers to reducing the quantity of data that represents a video signal by permanently eliminating certain redundant information in the video signal. The compression may be needed to comply with various constraints including, for example, bandwidth or storage requirements. Examples of such compression standards include MPEG and H.264.

Block-based video compression operates on, for example, fixed-shaped groups of neighboring pixels, often called a macroblock. For example, the H.264 standard specifies macroblocks of 16×16 pixels. In general, each frame of video can be divided into macroblocks, where each macroblock consists of a plurality of smaller-sized blocks. These pixel groups within the macroblocks and blocks are compared with either data found in the current frame or in other frames in order to formulate prediction data and error signals.

The error signals for each block are then transformed using, for example, a discrete cosine transform (DCT). The resulting transform coefficients for each block are then quantized, and the quantized coefficients are then encoded according to an encoding scheme such as context-adaptive binary arithmetic coding (CABAC).

The degree to which the transform coefficients are quantized referred to as the quantization level, affects the number of bits used to represent the image data as well as the quality of the resulting decoded image. Generally, when the quantization level is set to a high value, more coefficients are set to 0. This results in higher compression but also deteriorates the quality of the image. Conversely, when the quantization level is set to a low value, fewer coefficients are set to 0. This results in improved image quality but less compression.

Since visual quality of the video can depend on how the quantization level is distributed across frames in a video sequence, it is useful to control the quantization level across each frame. Some current techniques apply a uniform quantization level across each frame. However, these techniques do not allow for applying a lower quantization level to parts of a frame that are of more visual importance, such as a human face. Similarly, these uniform quantization level techniques also do not allow for applying a higher quantization level to parts of a frame that are of less visual importance, such as a background region.

To overcome these difficulties, it would be desirable to efficiently select the quantization level for each macroblock without increases in overhead and computational complexity of the encoder/decoder.

Block artifacts manifest as discontinuities between adjacent blocks. Such discontinuities are visually disturbing and also reduce the effectiveness of a reconstructed frame as a predictor for subsequent frames.

To remove these discontinuities, loop filtering can be applied to reconstructed frames during a reconstruction path, which is discussed in more detail below. The choice of loop filter and the strength of the loop filter can have a significant effect on image quality. A filter that is too strong may cause blurring and loss of detail. A filter that is too weak may not adequately suppress discontinuities between adjacent blocks.

As such, described herein are embodiments of an efficient adaptive segmentation scheme for efficiently transmitting a segmentation map and a set of parameters, such as a quantization level and loop filter type and/or strength, to be applied to each segment in the segmentation map.

Although the description of embodiments of the adaptive segmentation innovations are described in the context of the VP8 video coding format, alternative embodiments of the present invention can be implemented in the context of other video coding algorithms.

FIG. 1 is a block diagram of a generalized video encoder 14 using a loop filter 34 according to one embodiment of the present invention. Referring to FIG. 1, to encode an input video stream 16, encoder 14 performs functions in a forward path (shown by the solid connection lines) to produce an encoded or compressed bitstream 26, where the forward path includes intra/inter prediction stage 18, transform stage 19, quantization stage 22 and entropy encoding 24. Encoder 14 also includes a reconstruction path (shown by the dotted connection lines) to reconstruct a frame for encoding of further macroblocks. Encoder 14 includes the following stages in the reconstruction path: dequantization stage 28, inverse transform (or prediction) stage 30, reconstruction stage 32 and loop filtering stage (also called loop filter) 34. Other structural variations of encoder 14 can be used to encode bitstream 26.

Referring to FIG. 1, when input video stream 16 is presented for encoding, each frame within input video stream 16 can be processed in units of macroblocks. At intra/inter prediction stage 18, each macroblock can be encoded using either intra prediction or inter prediction mode. In either case, a prediction macroblock can be formed based on a reconstructed frame. In the case of intra-prediction, a prediction macroblock can be formed from samples in the current frame that have been previously encoded and reconstructed. In the case of inter-prediction, a prediction macroblock can be formed from one or more reference frames such as previous or future frames that have already been encoded and reconstructed.

Next, still referring to FIG. 1, the prediction macroblock can be subtracted from the current macroblock to produce a residual macroblock (residual). Transform stage 19 transform codes the residual and quantization stage 22 quantizes the residual to provide a set of quantized transformed coefficients. The quantized transformed coefficients are then entropy coded by entropy encoding stage 24. The entropy-coded coefficients, together with the information required to decode the macroblock, such as the type of prediction mode used, motion vectors and quantizer value, are output to compressed bitstream 26.

The reconstruction path in FIG. 1 is present to permit both the encoder and the decoder to use the same reference frames required to decode the macroblocks. The reconstruction path, similar to functions that take place during the decoding process, which are discussed in more detail below, includes dequantizing the transformed coefficients by dequantization stage 28 and inverse transforming the coefficients by inverse transform stage 30 to produce a derivative residual macroblock (derivative residual). At the reconstruction stage 32, the prediction macroblock can be added to the derivative residual to create a reconstructed macroblock. The loop filter 34 can be applied to the reconstructed macroblock to reduce blocking artifacts.

Figure 2:
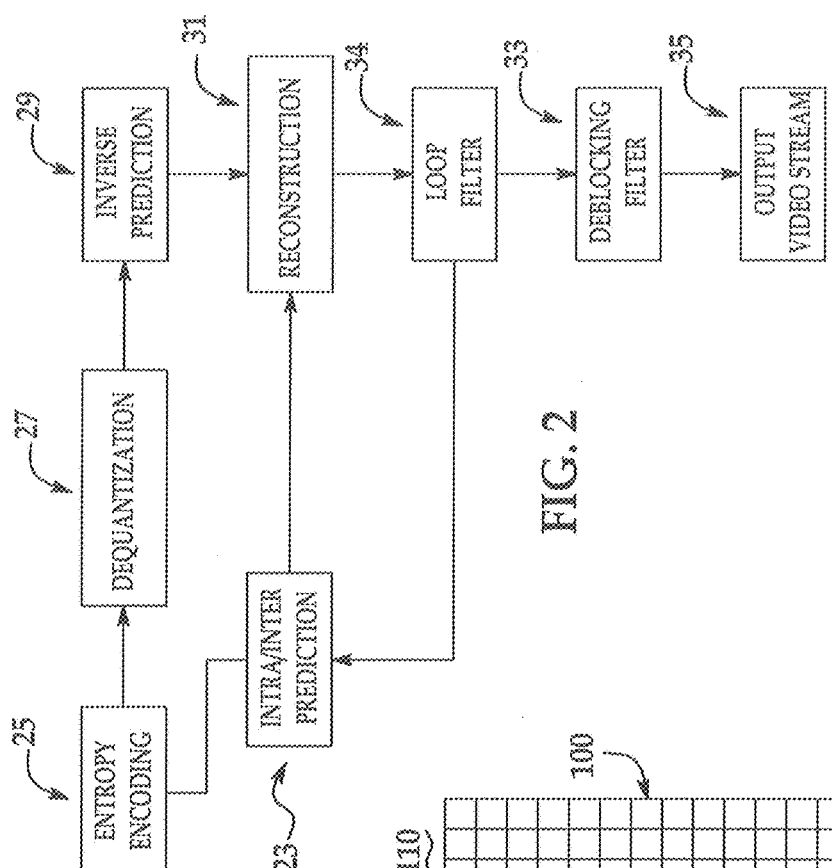
FIG. 2 is a block diagram of a video decompression system in accordance with one embodiment of the present invention.

Referring to FIG. 2, in accordance with one embodiment, to decode compressed bitstream 26, a decoder 21, similar to the reconstruction path of the encoder 14 discussed previously, performs functions to produce an output video stream 35 using entropy decoding stage 25, dequantization stage 27, inverse transform (or prediction) stage 29, intra/inter prediction stage 23, reconstruction stage 31, loop filter 34 and deblocking filtering stage (also called deblocking filter) 33. Other structural variations of decoder 21 can be used to decode compressed bitstream 26.

When compressed bitstream 26 is presented for decoding, the data elements can be entropy decoded by entropy decoding stage 25 to produce a set of quantized coefficients. Dequantization stage 27 dequantizes and inverse transform stage 29 inverse transforms the coefficients to produce a derivative residual that is identical to that created by the reconstruction stage in encoder 14. Using header information decoded from the compressed bitstream 26, at intra/inter prediction stage 23, decoder 21 creates the same prediction macroblock as was created in encoder 14. At the reconstruction stage 33, the prediction macroblock can be added to the derivative residual to create a reconstructed macroblock. The loop filter 34 can be applied to the reconstructed macroblock to reduce blocking artifacts. A deblocking filter 33 can be applied to the reconstructed macroblock to further reduce blocking distortion and the result can be outputted to output video stream 35.

Figure 3:
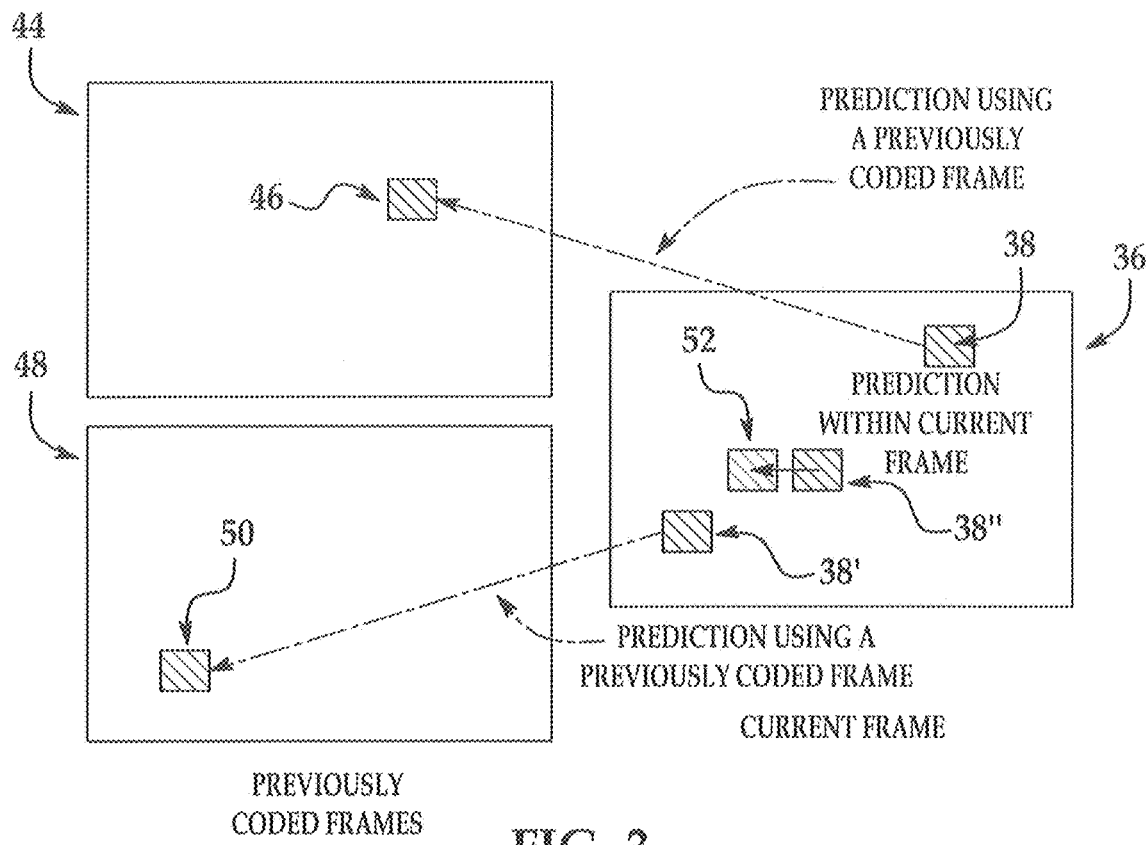
FIG. 3 is a schematic diagram of intra-prediction and inter-prediction modes used in the video compression and decompression systems of FIGS. 1 and 2.

FIG. 3 shows reference frames 44, 48 and a current frame 36 that is currently being encoded or decoded. As discussed previously, each frame can be processed in units of macroblocks, and at intra/inter prediction stage 18, each macroblock can be encoded using either intra prediction or inter prediction mode. For example, a current macroblock 38 can be encoded or decoded using inter prediction from a macroblock 46 from previously coded reference frame 44. Similarly, a current macroblock 38' can be encoded or decoded using inter prediction from a macroblock 50 from previously encoded reference frame 48. Also, for example, a current macroblock 38" can be encoded or decoded using intra prediction from a macroblock 52 within current frame 36.

Figure 4A:
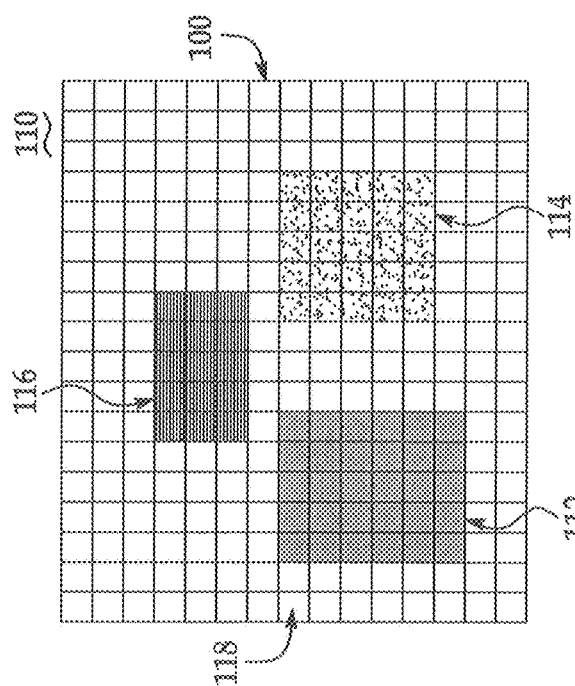
FIG. 4A is an exemplary segmentation map used in the video compression and decompression systems of FIGS. 1 and 2.
Figure 4B:
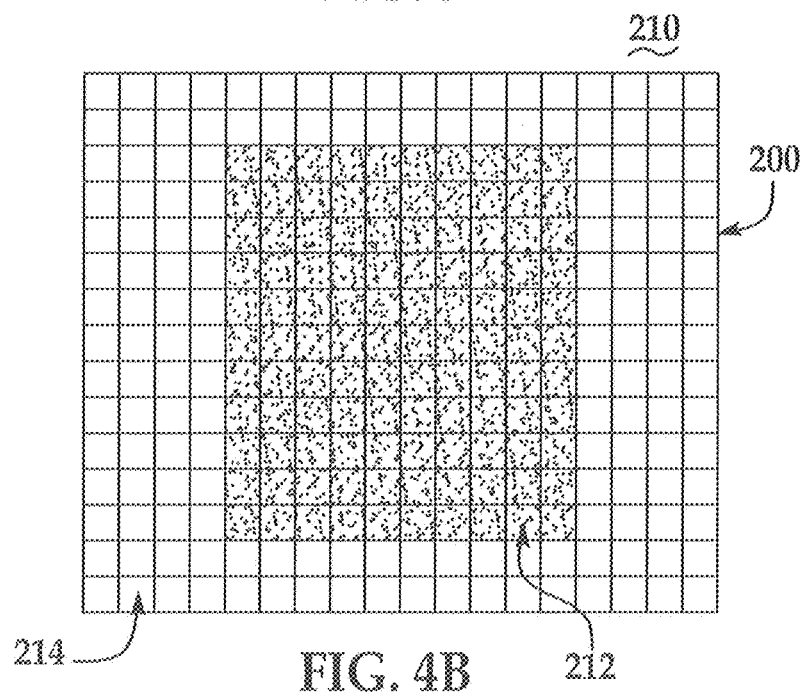
FIG. 4B is an alternative exemplary segmentation map used in the video compression and decompression systems of FIGS. 1 and 2.

FIGS. 4A-4B illustrate exemplary segmentation maps for sample frames according to embodiments of the present invention.

Referring to FIG. 4A, an exemplary segmentation map 100 segments a frame 110 into four segments: three foreground segments 112, 114, and 116 and one background segment 118. According to one embodiment of the present invention, all of the macroblocks corresponding to foreground segment 112 (as shown by the white macroblocks) are encoded using the same quantization level and loop filter type and/or strength, all of the macroblocks corresponding to foreground segment 114 (as shown by the black macroblocks) are encoded using the same quantization level and loop filter type and/or strength, all of the macroblocks corresponding to foreground segment 116 (as shown by the dotted macroblocks) are encoded using the same quantization level and loop filter type and/or strength, and all of the macroblocks corresponding to background segment 118 (as shown by the lined macroblocks) are encoded using the same quantization level and loop filter type and/or strength. Accordingly, each segment may have a different quantization level and loop filter type and/or strength.

Segmentation map 100 can be useful when encoder 14 is coding frames that include image data having foreground and background imagery where the image data in the foreground varies more from frame to frame than the background imagery. A sequence of frames could include the faces of three people having a conversation in front of a house. The three faces would be an example of foreground imagery and the house would be an example of background imagery. Since video quality can be more important at foreground segments 112, 114 and 116, rather than at background segment 118, a lower quantization level and a better loop filter type and/or strength can be applied to foreground segments 112, 114 and 116.

Referring to FIG. 4B, an exemplary segmentation map 200 segments a frame 210 into two segments: one body segment 212 and one border segment 214. According to one embodiment of the present invention, all of the macroblocks corresponding to body segment 212 (as shown by the dotted macroblocks) are encoded using the same quantization level and loop filter type and/or strength and all of the macroblocks corresponding to border segment 214 are encoded using the same quantization level and loop filter type and/or strength (as shown by the white macroblocks).

Segmentation map 200 can be useful when encoder 14 is coding a sequence of images where there is a zoom-in. Since video quality can be more important at body segment 212, rather than at border segment 214, lower quantization level and a better loop filter type and/or strength can be applied to body segment 212.

FIGS. 4A and 4B only provide examples of segmentation maps. Other suitable segmentation maps are also available that, for example, contain any number of segments, contain equally-sized or unequally-sized segments, contain contiguous or non-contiguous macroblocks, or are either user-defined or pre-set within the encoder.

The choice to enable/disable segmentation (i.e. segmentation condition) and the definition of the segmentation map may be decided by the encoder, passed in by an external application or specified by a user. As one example, a video conferencing application may pass in a map to define a segment of where a person's head is located.

Figure 5:
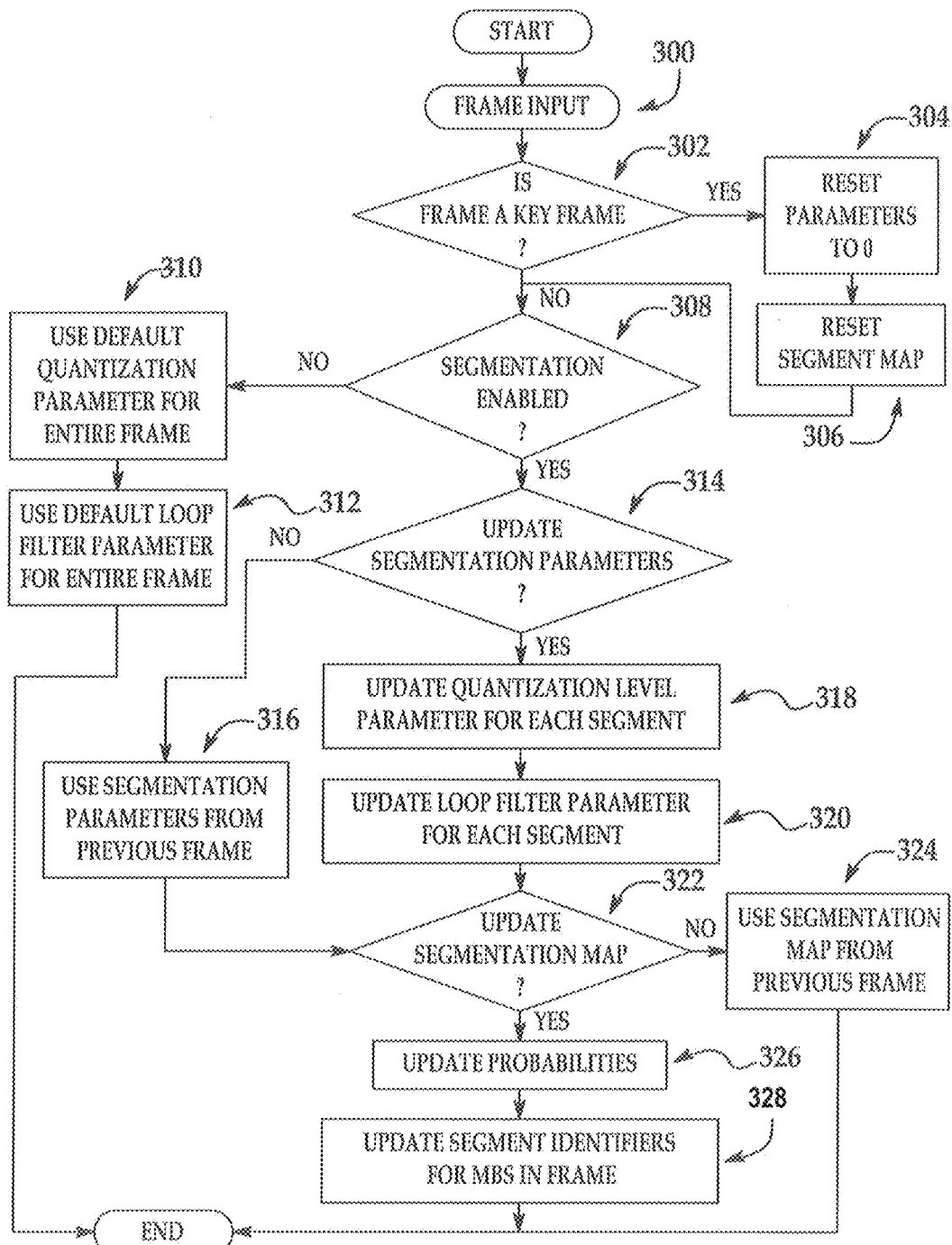
FIG. 5 is a flowchart diagram of a method of controlling segmentation of video used in the video compression system of FIG. 1.

FIG. 5 is a flowchart of a method of controlling segmentation of video data according to one embodiment of the present invention. Referring to FIG. 5, encoder 14 receives frame input at step 300. Encoder 14 then determines whether the current frame is a frame coded without reference to any other frame except itself, which is commonly referred to as a key frame at step 302. If the current frame is a key frame, encoder 14 resets the parameters to zero at step 304 and resets the segment map at step 306 in order to map all macroblocks to the same segment. The parameters are, for example, the quantization level and loop filter strength. Encoder 14 then proceeds to step 308.

If the current frame is not a key frame or if the current frame is a key frame and encoder 14 has reset the parameters and segment map, encoder 14 then determines if segmentation is enabled at step 308. The bitstream header for each frame includes a single bit that enables or disables segmentation. However any suitable flag, data structure or other data record can be used in lieu of a bit. If segmentation is disabled, encoder 14 can apply a default quantization parameter at step 310 and a default loop filter strength parameter at step 312 to the whole frame.

Segmentation parameters may be, for example, a quantization level, a loop filter type, a loop filter strength, a reference frame type or a selection of a sub-pixel interpolation filter. Other segmentation parameters are also available.

As one example, one of the segment parameters may be a reference frame type. The reference frame type may have values indicative one or more previous frames, future frames or some combination thereof that have already been encoded and reconstructed. Accordingly, reference frame type may include, for example, a last frame, a golden frame or an alternate reference frame. The last frame can be the previously encoded frame before the current frame. The golden frame can be a past frame chosen arbitrarily from the distant past to use as a predictor for subsequent frames. The alternate reference frame may include any frame that is not the last frame or the golden frame. For example, the alternate reference can be a past frame, a future frame, or a constructed reference frame. Further, for example, the constructed reference frame may be the reference frame as disclosed in patent application titled "System and Method for Video Encoding Using Constructed Reference Frame" that is assigned to the assignee of the present invention, is filed concurrently herewith and which is hereby incorporated by reference in its entirety.

Encoder 14 and decoder 21 can then apply selective updates to those macroblocks that correspond to a given segment id in one or more reference frames as indicated by the segment parameter. In this way segmentation can be used as a method for updating a part of one or more of the reference frames, for example the background, using information from the current frame, without having to resort to a full update of the whole reference frame.

Although the embodiments of the adaptive segmentation innovations describe only two segmentation parameters (namely quantization level and loop filter strength), alternative embodiments of the present invention can be implemented using different segmentation parameters or any number of segmentation parameters.

If segmentation is disabled, encoder 14 can ignore any previously transmitted segmentation map as well as any previously transmitted segmentation parameters. This segmentation enable/disable binary switch or segmentation condition minimizes overhead and produces no more than one bit per frame for frames where segmentation provides little or no benefit.

Still referring to FIG. 5, if however segmentation is enabled, encoder 14 can determine if segmentation parameters are to be updated at step 314. If no updates to the segmentation parameters have been indicated, encoder 14 can use previously transmitted segmentation parameter values at step 316. In other words, the segmentation parameters can not be updated for the current video frame. This update segmentation parameters binary switch minimizes overhead by not retransmitting segmentation parameters where the segmentation parameters from the previous frame can be used for the current frame.

If updates to the segmentation parameters have been indicated, encoder 14 can update the segmentation parameters. Specifically, in our exemplary embodiment, the quantization level parameter can be updated and at step 318 and the loop filter strength parameter can be updated at step 320. The updated segmentation parameter values may either be absolute values or alternatively, delta (i.e. incremental or decremental) values that are added to baseline values. If the parameter values are delta, a clamping mechanism may be implemented to prevent the segmentation parameter values from exceeding an allowable range.

Still referring to FIG. 5, whether or not segmentation parameters are updated at step 314, encoder 14 can determine if segmentation map 100, 200 is to be updated at step 322. If no updates to segmentation map 100, 200 have been indicated, encoder 14 can use the previously transmitted segmentation map at step 324. This update segmentation map binary switch minimizes overhead by not retransmitting segmentation map 100, 200 where the segmentation map from the previous frame can be used for the current frame.

If updates to segmentation map 100, 200 have been indicated, encoder 14 can update probabilities of occurrence of each of the segment identifier bits at step 326. After probabilities of occurrence have been updated, encoder 14 can update segment identifiers for macroblocks in the current frame at step 328. Referring back to FIG. 4A, for example, segment identifiers associate each macroblock with a particular segment 112, 114, 116, 118 in segmentation map 100. Accordingly, if there are four segments 112, 114, 116, 118, there can be four segment identifiers that can be identified as, for example as 00, 01, 10 and 11. The process of FIG. 5 can be repeated for each frame that is received by encoder 14.

Exemplary pseudo code for implementing frame level header information to control the update of segmentation parameters and the segment map in adaptive segmentation is illustrated as follows:

```
// Is Segmentation Enabled
WriteBit( SegmentationEnabled );
if ( SegmentationEnabled )
{
    // Signal whether or not the segmentation map and parameters are to
    be updated in this frame
    WriteBit( UpdateMbSegmentationMap );
    WriteBit( UpdateMbSegmentationParams );
    if (UpdateMbSegmentationParams)
    {
        WriteBit( MbSegmentAbsOrDelta );   // 0 indicates
parameters are delta values, 1 absolute values
        // For each segment parameter (quantizer and loop filter strength)
        for ( i = 0; i < 2; i++ )
        {
            for ( j = 0; j < 4; j++ )    // For each of the segments
            {
                Data = SegmentFeatureData[i][j];
                // Frame level data
                if ( Data )           // parameter is non zero
                {
                    WriteBit (1);
                    if (Data < 0)
                    {
                    WriteBit (1);          // - value (sign bit)
                    Data = –Data
                }
                else
                    WriteBit (0);          // + value (sign bit)
                                // In VP8 7 bits for quantizer parameter
                                and 6 for loop filter
                                WriteLiteral( Data, MbFeatureDataBits[i]);
                }
                else
                    WriteBit(0);        // Parameter was set to 0.
            }
        }
    }
    if ( UpdateMbSegmentationMap )
    {
        // Write out the tree node probabilities used to decode the
        segment id for each macro block.
        for ( i = 0; i < 3; i++ )
        {
            Data = MbSegmentTreeProbs[i];
            if ( Data != 255)
            {
```

-continued

```
        WriteBit(1);
        WriteLiteral(Data, 8);
    }
    else
        WriteBit(0);
    }
  }
}
```

Referring to the pseudo code above, the following is the list of variables and arrays and their significance to embodiments of the present invention:

SegmentationEnabled: segmentation enable/disable binary switch.

UpdateMbSegmentationMap: segmentation map update/no update binary switch.

UpdateMbSegmentationParams: segmentation parameters update/no update binary switch.

MbSegmentAbsOrDelta: binary switch to indicate whether values of the segmentation parameters in SegmentFeatureData array are delta values or absolute values.

SegmentFeatureData[i][j]: values of the segmentation parameters. (e.g. quantizer or loop filter strength)

MbSegmentTreeProbs[i]: Tree node probabilities (see FIG. 6 below).

Referring to the pseudo code, the SegmentationEnabled variable can be written to the bitstream to indicate whether segmentation is enabled. If segmentation is not enabled, neither the segmentation parameters nor the segmentation map are updated and, as discussed previously, any previously transmitted segmentation parameters or segmentation map are ignored by encoder 14 and decoder 21. If however, segmentation is enabled, the UpdateMbSegmentationParams bit can be written to indicate whether the segmentation parameters should be updated and UpdateMbSegmentationMap can be written to indicate whether the segment map should be updated. Any suitable flag, data structure or other data record can also be used in lieu of a bit.

If UpdateMbSegmentationParams is true, the MbSegmentAbsOrDelta bit can be written to the bitstream to indicate whether the segmentation parameters are delta values or absolute values. Then, for each of the two segment parameters (i.e., quantizer value and loop filter strength) for each of the four segments the data in SegmentFeatureData[i][j] can be written to the bitstream with its corresponding sign bit (if any). Any suitable flag, data structure or other data record can also be used in lieu of a bit.

If UpdateMbSegmentationMap is true, encoder 14 determines whether the data in MbSegmentTreeProbs[i] can be updated by testing whether any of the values in MbSegmentTreeProbs[i] array is 255. If one of the values in the array is 255, the particular node probability should not be updated. Otherwise, each node probability in MbSegmentTreeProbs[i] can be written to the bitstream.

The cost of updating the node probabilities can be incurred at the frame level and can be minimal. Following the pseudo code above, the cost can be anywhere from 3-27 bits per frame depending on how many probabilities are being updated. At the low-cost end, 3 bits result when the conditions indicate that none of the node probabilities should be updated. Accordingly, encoder 14 can perform a Writebit(0) operation three times. At the high-cost end, 27 bits result when the conditions indicate that all three of the node probabilities should be updated. Accordingly, encoder 14 can perform a Writebit(1) operation three times and write the three probability values from MbSegmentTreeProbs[i] at a cost of 8 bits each.

Alternatively, in one embodiment if UpdateMbSegmentationMap is true, all three probabilities from MbSegmentTreeProbs[i] at a cost of 8 bits each are always written to the bitstream at a cost of 24 bits. Exemplary pseudo code illustrating this embodiment is illustrated as follows:

```
if ( UpdateMbSegmentationMap )
    {
        // Write out the tree node probabilities used to decode the
            segment id for each macro block.
        for ( i = 0; i < 3; i++ )
        {
            Data = MbSegmentTreeProbs[i];
            WriteLiteral(Data, 8);
        }
    }
```

Figure 6:
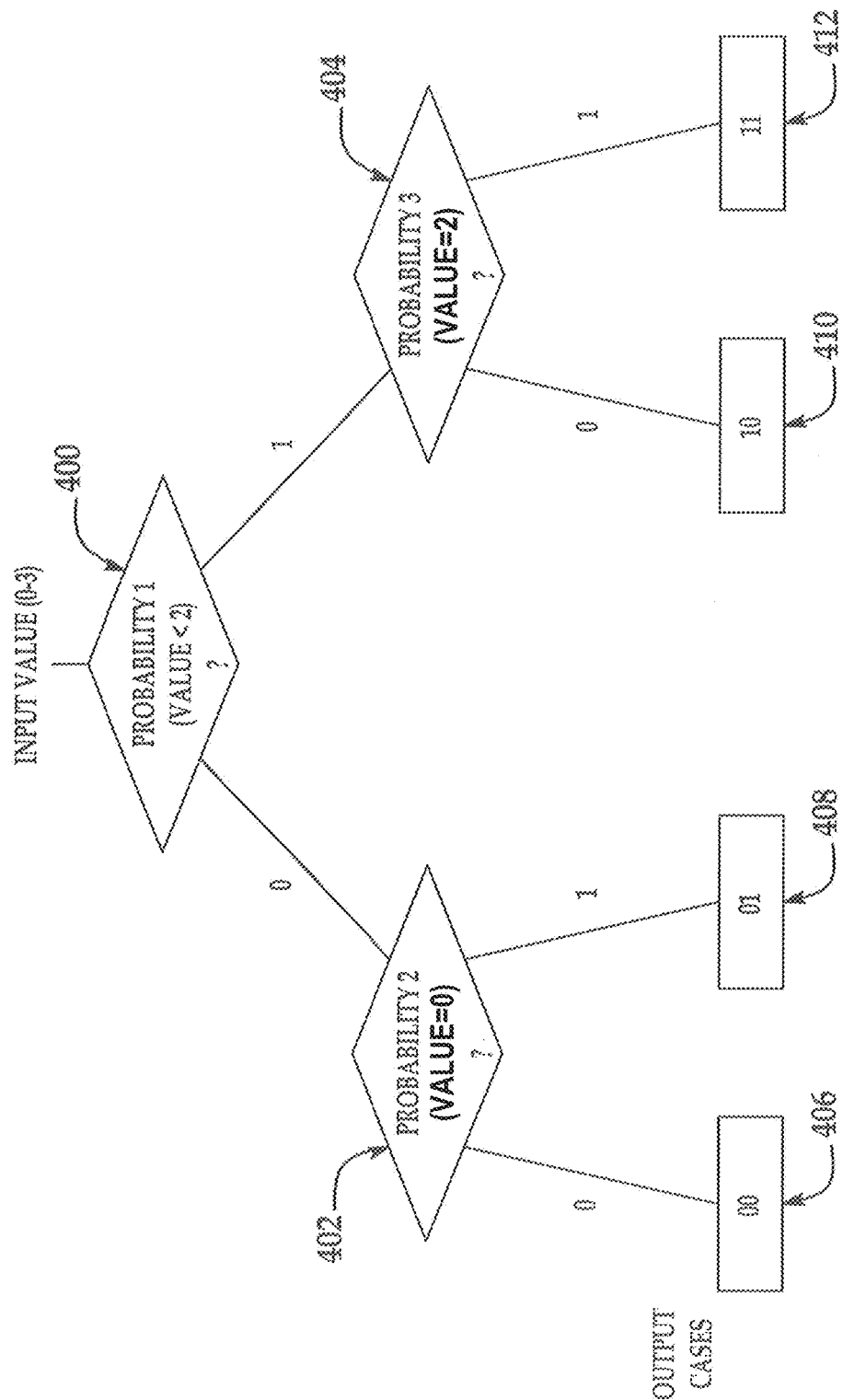
FIG. 6 is a schematic diagram of a binary tree used to code segment identifiers used in the video compression and decompression systems of FIGS. 1 and 2.

FIG. 6 illustrates the binary tree used to code the segment identifiers using the probabilities that a particular outcome 406, 408, 410 and 412 can occur. Each outcome 406, 408, 410 and 412 represents one of four segment identifiers: 00, 01, 10 and 11. As stated previously, embodiments of the invention may have different numbers of segment identifiers. Depending on the number of segments in various embodiments, the binary tree in FIG. 6 would be modified accordingly to represent the number of probabilities needed to code the particular number of segments. So, for example, if one embodiment contained 8 segments, the binary tree would include 7 probabilities at 7 different nodes in order to code 8 particular outcomes.

Each node 400, 402 and 404 has an associated probability that defines, for example, the likelihood that the left branch can be taken. The left branch, as illustrated in FIG. 6, corresponds to bits representing 0 whereas the right branch corresponds to bits representing 1. The likelihood that the left branch can be taken is the probability that value can correspond to what is represented at each node 400, 402 and 404. Accordingly, probability 1 at node 400 represents the likelihood that value can be less than 2. In other words, probability 1 represents the likelihood that outcomes 406, 408 can occur because they have a value of binary 00 and binary 01, respectively, which are less than 2. The formula 1—probability 1 can be used to calculate the likelihood that the right branch of node 400 can occur. In other words, 1—probability 1 represents the likelihood that outcomes 410, 412 can occur because they have a value of binary 10 and binary 11, respectively, which are greater than 2.

Probability 2 at node 402 represents the likelihood that value can be equal to 0. In other words, probability 2 represents the likelihood that outcome 406 can occur because it has a value of binary 00, which is equal to 0. The formula 1—probability 2 can be used to calculate the likelihood that the right branch of node 402 can occur. In other words, 1—probability 2 represents the likelihood that outcome 408 can occur because it has a value of binary 01, which is not equal to 0.

Probability 3 at node 404 represents the likelihood that value can be equal to 2. In other words, probability 3 represents the likelihood that outcome 410 can occur because it has a value of binary 10, which is equal to 2. The formula 1—probability 3 can be used to calculate the likelihood that the right branch of node 404 can occur. In other words, 1—probability 3 represents the likelihood that outcome 412 can occur because it has a value of binary 11, which is not equal to 2.

Probability can be expressed, for example, as an integer in the range of 1-254 where 1 represents that it is least likely that the left branch of each node 400, 402 and 404 can occur and 254 represents that it is most likely that the left branch of each node 400, 402 and 404 can occur. Each probability reflects the number of macroblocks that have been assigned to each segment. Accordingly, if most macroblocks are assigned to segment 00, probability 1 and probability 2 can be high. The probability can also be expressed using different ranges or values and signify other meaning such as the likelihood that the right branch can be taken.

There are various types of coding schemes, such as arithmetic coding or Huffman coding. Since arithmetic coding translates the entire message sequence into one number whereas Huffman coding than translates each symbol of the message into a series of digits, arithmetic coding can be more efficient than Huffman coding. Accordingly, arithmetic coding can be used in the preferred embodiment of the invention. Other coding schemes, like Huffman coding, or combinations of coding schemes are used in alternative embodiments of the invention.

An arithmetic encoder can be used to encode at entropy encoding stage 24 (see FIG. 1) or decode at entropy decoding stage 25 (see FIG. 2) a zero or one using each of the three probabilities in order to represent one of the four segment identifiers. Arithmetic coding generally involves representing a message sequence as a single floating point output number within a given range. Typically, this range can be a probability line from 0 to 1. Each symbol (i.e. segment identifier) in the message sequence can be represented by ranges occupying a part of the probability line. If a symbol has a high probability, it can receive a larger range on the probability line, and if a symbol has a low probability, it can receive a smaller range on the probability line.

During coding, the real number used to represent the message sequence can be formulated based on what range each symbol falls in. As each symbol in the message is processed, the range can be narrowed to that portion allocated to the symbol. As the message becomes longer, the range needed to represent it becomes smaller, and the number of bits needed to specify that range grows. The more likely symbols (i.e. symbols that have a higher probability) reduce the range by less than the unlikely symbols (i.e. symbols that have a lower probability) and thus, add fewer bits to the message.

Referring back to FIG. 6, if each segment identifier would be coded separately, it would be at a cost of 2 bits per segment identifier. However, using the arithmetic coding scheme above, if all four segment identifiers are being used but some have higher probabilities than others, the average cost of coding the segment identifiers can be much less than 2 bits. If less than four segment identifiers are being used, the cost of coding each of the segment identifiers can be even less.

Figure 7:
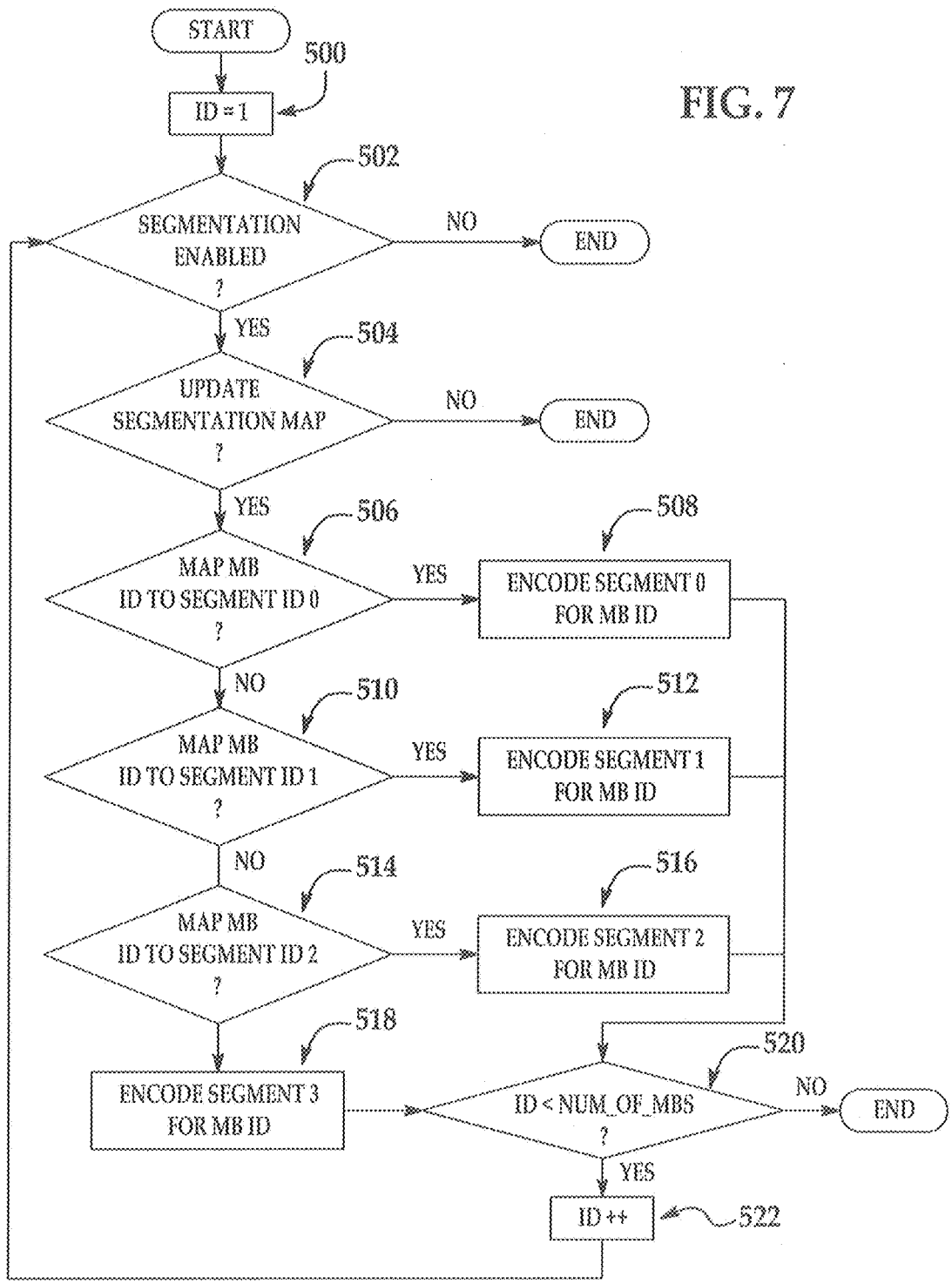
FIG. 7 is a flowchart diagram of a method of encoding a segment identifier used in the video compression system of FIG. 1.

FIG. 7 is a flowchart of a method of encoding a segment identifier for each macroblock according to one embodiment of the present invention. At step 500, encoder 14 sets the first macroblock to ID equals 1. ID represents the macroblock identification number that is currently being encoded in the frame.

Then, encoder 14 determines whether segmentation is enabled at step 502. If segmentation is not enabled, a segment identifier is not encoded for the macroblock. If segmentation is enabled, encoder 14 determines whether the segmentation map is to be updated at step 504. If an update to the segmentation map has not been indicated, a new segment identifier is not encoded for the macroblock and the previous segment map can be used in coding.

If however, an update to the segmentation map has been indicated, a macroblock can be assigned a segment ID based on its position within the segment map. Accordingly, encoder 14 determines whether macroblock with identification number ID is to be mapped to segment 0 at step 506. If the macroblock with identification number ID is to be mapped to segment 0, encoder 14 encodes segment 0 (binary 00) for macroblock with identification number ID at step 508. If the macroblock with identification number ID is not to be mapped to segment 0, encoder 14 determines whether macroblock with identification number ID is to be mapped to segment 1 at step 510. If the macroblock with identification number ID is to be mapped to segment 1, encoder 14 encodes segment 1 (binary 01) for macroblock with identification number ID at step 512. If the macroblock with identification number ID is not to be mapped to segment 1, encoder 14 determines whether macroblock with identification number ID is to be mapped to segment 2 at step 514. If the macroblock with identification number ID is to be mapped to segment 2, encoder 14 encodes segment 2 (binary 10) for macroblock with identification number ID at step 516. If the macroblock with identification number ID is not to be mapped to segment 2, encoder 14 encodes segment 3 (binary 11) for macroblock with identification number ID at step 518.

Once the segment identifier has been encoded for the macroblock at step 508, 512, 516 or 518, encoder 14 determines at step 520 whether ID is less than NUM_OF_MBS, which represents the total number of macroblocks in the current frame. If ID is not less than the total number of macroblocks, no more segment identifiers need to be encoded for each macroblock in the current frame. Otherwise, if ID is less than NUM_OF_MBS, encoder 14 increases ID by 1 at step 522 and repeats the process until all macroblock segment identifiers have been encoded for the current frame.

Exemplary pseudo code for implementing the steps of the method in FIG. 7 is illustrated as follows:

```
for each macroblock in the frame
{
    ...
    ...
    // If segmentation is enabled and a map update is indicate then
    // encode the segment id for this macroblock
    if ( SegmentationEnabled && UpdateMbSegmentationMap )
    {
        switch ( SegmentId )
        {
            case 0:
                EncodeBit (0, MbSegmentTreeProbs[0]);
                EncodeBit (0, MbSegmentTreeProbs[1]);
                break;
            case 1:
                EncodeBit (0, MbSegmentTreeProbs[0]);
                EncodeBit (1, MbSegmentTreeProbs[1]);
                break;
            case 2:
                EncodeBit (1, MbSegmentTreeProbs[0]);
                EncodeBit (0, MbSegmentTreeProbs[2]);
                break;
            case 3:
                EncodeBit (1, MbSegmentTreeProbs[0]);
                EncodeBit (1, MbSegmentTreeProbs[2]);
                break;
        }
```

```
    }
}
```

Referring to the pseudo code above, for each macroblock in a frame, if segmentation is enabled and the segmentation map is being updated, a segment identifier is encoded using, for example, an EncodeBit(value, probability) function. By making two calls to the EncodeBit function in the encoder, the segment identifier is encoded for each macroblock. In each call to the EncodeBit function, the encoder codes an input bit "value" which is either 0 or 1 by using one of the three "probability" values as context for the coding process. The three probability values are designated as an array of three values called MbSegmentTreeProbs. The context provides guidance to the encoder as to the probability distribution of each segment identifier depending on how likely it is to appear in the input sequence.

The aforementioned exemplary pseudo code is an implementation that supports four segment identifiers. As stated previously, other numbers of segments can be supported and the pseudo code may be modified accordingly to represent the correct number of segments. Furthermore, the exemplary pseudo code is not intended to be limited to any particular programming language and implementation thereof. It can be appreciated that a variety of programming languages and implementations thereof may be used to implement the teachings of embodiments of the invention as described herein.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for decoding compressed video information, comprising:
    receiving a compressed video stream, the compressed video stream including compressed video information, the compressed video information including a plurality of frames, each frame from the plurality of frames including a plurality of blocks;
    reading, from the compressed video information, a segment map associating at least some of the plurality of blocks in a first frame of the plurality of frames with at least one segment identifier;
    reading, from the compressed video information, a current block to be decoded by a decoder;
    reading, from the segment map, a segment identifier that is associated with the current block;
    reading, from the compressed video information, at least one segment parameter associated with the segment identifier that is associated with the current block;
    decoding, by a processor in response to instructions stored on a non-transitory computer readable medium, the current block using the at least one segment parameter associated with the segment identifier that is associated with the current block; and
    outputting the decoded current block for presentation.

2. The method of claim 1, wherein the at least one segment parameter includes at least one of a quantization parameter, a loop filter type, a loop filter strength value or a sub-pixel interpolation filter.

3. The method of claim 2, wherein a plurality of segment parameters are associated with the segment identifier and a first one of the plurality of segment parameters includes a value indicative of an alternate reference frame; and where the method further comprises:
    updating the alternate reference frame using at least a second one of the plurality of segment parameters associated with the at least one segment identifier.

4. The method of claim 1, further comprising:
    determining whether a frame subsequent to the first frame specifies an updated segment parameter for a specific one of the segments; and
    associating the updated segment parameter to the specific one of the segments.

5. The method of claim 4, wherein the updated segment parameter is an incremental value to be added to the at least one segment parameter.

6. The method of claim 1, further comprising:
    reading, from the compressed video information, a record indicative of a segmentation condition of a frame subsequent to the first frame; and
    setting the at least one segment parameter to a respective default parameter and suppressing the reading of the segment map, the reading of the segment identifier and the reading of the at least one segment parameter for all blocks of the frame subsequent to the first frame when the segmentation condition indicates to not apply segmentation.

7. The method of claim 1, wherein reading the segment map further comprises:
    reading the at least one segment identifier in portions of the compressed video information that are interleaved with data specific to the at least some of the plurality of blocks.

8. The method of claim 1, wherein reading the segment map further comprises:
    reading the at least one segment identifier in a header portion associated with the first frame.

9. The method of claim 1, further comprising:
    determining whether a frame subsequent to the first frame is a key frame; and
    setting the at least one segment parameter to a default value when the frame subsequent to the first frame is a key frame.

10. A method for creating a stream of encoded video information including a plurality of frames, each having a plurality of blocks, comprising:
    for at least a first frame, creating a segment map associating at least one block in the first frame with at least one segment identifier, and associating the at least one segment identifier with at least one segment parameter;
    selecting a current block of the first frame for encoding by an encoder;
    encoding a segment identifier associated with the current block based on the segment map;
    encoding, by a processor in response to instructions stored on a non-transitory computer readable medium, the current block using the at least one segment parameter associated with the segment identifier that is associated with the current block;
    including the encoded segment identifier and the encoded current block in an output bitstream; and
    transmitting or storing the output bitstream.

11. The method of claim 10, further comprising:
for a second frame, detecting a segmentation modification condition;
when the segmentation modification condition is detected, updating the at least one segment parameter and storing the updated segment parameter with video information associated with the second frame.

12. The method of claim 11, wherein the updated segment parameter is an incremental value.

13. The method of claim 10, further comprising:
for a second frame, detecting a segmentation condition; and
when the segmentation condition is detected, storing a segmentation flag with encoded video information associated with the second frame.

14. The method of claim 10, wherein the at least one segment parameter includes at least one of a quantization parameter, a loop filter type, a loop filter strength or a sub-pixel interpolation filter.

15. The method of claim 14, wherein the at least one segment parameter includes a value indicative of an alternate reference frame; and where the method further comprises:
updating the alternate reference frame using the at least one segment parameter.

16. The method of claim 10, further comprising:
storing the at least one segment identifier in portions of the video information that are interleaved with data specific to the at least one block.

17. The method of claim 10, further comprising:
storing the at least one segment identifier in a header portion of the first frame.

18. A method for decoding a stream of encoded video information, the method comprising:
receiving an encoded video stream, the encoded video stream including encoded video information, the encoded video information including a plurality of frames, each frame from the plurality of frames including a plurality of blocks;

for at least a first frame, reading from the encoded video information a segment map associating at least some of the plurality of blocks in the first frame with at least one segment identifier;

reading, from the encoded video information, a current block of the first frame to be decoded by a decoder;

reading, from the segment map, a segment identifier associated with the current block;

reading, from the encoded video information, at least one segment parameter associated with the segment identifier that is associated with the current block;

decoding the current block using the at least one segment parameter associated with the segment identifier that is associated with the current block;

for a second frame, decoding, by a processor in response to instructions stored on a non-transitory computer readable medium, a block from the second frame corresponding to the current block in the first frame using the segment identifier that is associated with the current block; and outputting the decoded block from the second frame for presentation.

19. The method of claim 18, wherein the at least one segment parameter includes at least one of a quantization parameter, a loop filter type, a loop filter strength value or a subpixel interpolation filter.

20. The method of claim 18, wherein the second frame includes frame level header information including a bit indicating whether segmentation is enabled or disabled for the second frame, a bit indicating whether or not to update the segment map, a bit indicating whether to update the at least one segmentation parameter for the second frame, a value for each of the at least one segmentation parameter, and a bit indicating whether the value is a delta value or an absolute value.

* * * * *